United States Patent
Delanghe et al.

(10) Patent No.: US 7,492,415 B2
(45) Date of Patent: Feb. 17, 2009

(54) METHOD AND SYSTEM FOR DATA COMPRESSION FOR STORAGE OF 3D COMB FILTER DATA

(75) Inventors: Brad Delanghe, Sunnyvale, CA (US); Aleksandr Movshovich, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 847 days.

(21) Appl. No.: 10/869,395

(22) Filed: Jun. 16, 2004

(65) Prior Publication Data

US 2005/0174492 A1    Aug. 11, 2005

Related U.S. Application Data

(60) Provisional application No. 60/542,588, filed on Feb. 5, 2004.

(51) Int. Cl.
*H04N 9/77* (2006.01)
*H04N 9/78* (2006.01)

(52) U.S. Cl. ...................... 348/663; 348/665

(58) Field of Classification Search ......... 348/663–670; 386/31–33
See application file for complete search history.

(56) References Cited

U.S. PATENT DOCUMENTS

| | | | | | |
|---|---|---|---|---|---|
| 4,225,873 | A * | 9/1980 | Winslow | ...................... | 369/61 |
| 4,470,069 | A * | 9/1984 | Lewis et al. | .................. | 348/665 |
| 4,499,502 | A * | 2/1985 | Dakin et al. | .................. | 386/27 |
| 4,524,423 | A * | 6/1985 | Acampora | ................... | 708/319 |
| 4,641,180 | A * | 2/1987 | Richter | ....................... | 348/669 |
| 4,831,463 | A * | 5/1989 | Faroudja | ...................... | 386/27 |
| 5,006,927 | A * | 4/1991 | Creed et al. | ................. | 348/665 |
| 5,220,413 | A * | 6/1993 | Jeong | ......................... | 348/665 |
| 5,589,888 | A * | 12/1996 | Iwasaki | ...................... | 348/669 |
| 5,673,355 | A * | 9/1997 | Strolle et al. | ................... | 386/9 |
| 5,745,641 | A * | 4/1998 | De Haan et al. | ................ | 386/95 |
| 5,844,629 | A * | 12/1998 | Murray et al. | ............... | 348/642 |
| 6,055,024 | A * | 4/2000 | DiMeo et al. | ............... | 348/668 |
| 6,288,754 | B1 * | 9/2001 | Ito | ............................. | 348/663 |
| 6,327,002 | B1 * | 12/2001 | Rinaldi et al. | ............... | 348/554 |
| 6,377,313 | B1 * | 4/2002 | Yang et al. | .................. | 348/630 |
| 6,462,790 | B1 * | 10/2002 | Lowe et al. | .................. | 348/665 |
| 6,667,776 | B1 * | 12/2003 | Sumiyoshi et al. | .......... | 348/669 |
| 6,833,875 | B1 * | 12/2004 | Yang et al. | .................. | 348/665 |
| 7,151,574 | B2 * | 12/2006 | Dong et al. | .................. | 348/663 |
| 2005/0117065 | A1 * | 6/2005 | Cookman et al. | ........... | 348/663 |

* cited by examiner

*Primary Examiner*—Victor R Kostak
(74) *Attorney, Agent, or Firm*—McAndrews, Held & Malloy, Ltd.

(57) ABSTRACT

Methods and systems for data compression for storage of 3D comb filter data are disclosed. An incoming video signal may be band-limited during combing, where the incoming video signal may comprise a plurality of active and inactive video samples disposed within a plurality of video lines. The active video samples disposed within at least a portion of the plurality of video lines may be stored. The incoming video signal may be band-limited to 6.75 MHz, for example. Video samples utilized for eliminating edge effects may be stored. The number of video samples utilized for eliminating edge effects may be associated with an upsampling filter tap count. The active video samples may be combed. At least a portion of the plurality of video lines may be stored. The portion of the plurality of video lines may comprise active video lines.

60 Claims, 9 Drawing Sheets

METHOD AND SYSTEM FOR DATA COMPRESSION FOR STORAGE OF 3D COMB FILTER DATA

CROSS-REFERENCE TO RELATED APPLICATIONS/INCORPORATION BY REFERENCE

This patent application makes reference to, claims priority to and claims benefit from U.S. Provisional Patent Application Ser. No. 60/542,588, entitled "DATA COMPRESSION FOR STORAGE OF 3D COMB FILTER DATA," filed on Feb. 5, 2004, the complete subject matter of which is hereby incorporated herein by reference, in its entirety.

This application makes reference to:
U.S. application Ser. No. 10/943,267 filed Sep. 17, 2004;
U.S. application Ser. No. 10/943,587 filed Sep. 17, 2004;
U.S. application Ser. No. 10/943,593 filed Sep. 17, 2004;
U.S. application Ser. No. 10/943,596 filed Sep. 17, 2004; and
U.S. application Ser. No. 10/943,641 filed Sep. 17, 2004.

The above stated applications are hereby incorporated herein by reference in their entirety.

FIELD OF THE INVENTION

Certain embodiments of the invention relate to processing of video signals. More specifically, certain embodiments of the invention relate to a method and system for data compression for storage of 3D comb filter data.

BACKGROUND OF THE INVENTION

In video system applications, a picture is displayed on a television or computer screen by scanning an electrical signal horizontally across the screen one line at a time. The amplitude of the signal at any one point on the line represents the brightness level at that point on the screen. A video frame contains the necessary information from all the lines that make up the picture and from all the associated synchronization (sync) signals to allow a scanning circuit to trace the lines from left to right and from top to bottom in order to recreate the picture on the screen. This information includes the luma (Y), or brightness, and the chroma (C), or color, components of the picture. There may be two different types of picture scanning in a video system. The scanning may be interlaced or it may be non-interlaced or progressive. Interlaced scanning occurs when each frame is divided into two separate sub-pictures or fields. The interlaced picture may be produced by first scanning the horizontal lines that correspond to the first field and then retracing to the top of the screen and scanning the horizontal lines that correspond to the second field. The progressive or non-interlaced picture may be produced by scanning all of the horizontal lines of a frame in one pass from the top to the bottom of the screen.

In video processing, the luma (Y) and chroma (C) signal components are modulated together in order to generate a composite video signal. Integrating the luma and chroma video elements into a composite video stream facilitates video signal processing since a single composite video stream is broadcasted. Once a composite signal is received, the luma and chroma signal components must be separated in order for the video signal to be processed and displayed. A comb filter may be utilized for separating the chroma and luma video signal components. For example, a television set may be adapted to receive a composite video input, but the chroma and luma video components have to be separated before the television can display the received video signal.

FIG. 1A is a diagram illustrating the generation of a conventional composite video signal. Referring to FIG. 1A, a conventional composite video signal 105 may be generated from a luma component 103 and a chroma component 101. The composite video signal 105 may be generated by adding the chroma video signal component 101 and the luma video signal component 103. The chroma signal component 101 may or may not comprise a constant chroma across the entire line. The luma signal component 103 may increase in amplitude in a stair step fashion or it may not.

FIG. 1B is a graph illustrating the frequency spectrum for a luma signal component 110 and a chroma signal component 112 of the composite video signal of FIG. 1A.

FIG. 2A is a diagram illustrating modulated chroma signals in contiguous composite video frames. The chroma component may be modulated so that a frequency of each successive line of video may be phase-shifted by 180 degrees with respect to the previous line. Referring to FIG. 2A, the previous frame 201 may comprise a previous line 203, a current line 205, and a next line 207. Similarly, the current frame 209 may comprise a previous line 211, a current line 213, and a next line 215. The current line 213 in the current frame 209 may be phase-shifted by 180 degrees from the previous line 211 in the current frame 209, as well as from the next line 215 in the current frame 209. Similarly, the current line 205 in the previous frame 201 may be phase-shifted by 180 degrees from the previous line 203 in the previous frame 201, as well as from the next line 207 in the previous frame 201. In addition, since fields in the contiguous composite video signal are at a frequency rate of 59.94 Hz for a NTSC signal, and 50 HZ for a PAL signal, there may be a 180-degree phase shift between two adjacent frames. For example, there may be a 180-degree phase shift between the current frame 209 and the previous frame 201. Correspondingly, the current line 213 in the current frame may be 180 degrees phase-shifted from the current line 205 in the previous frame 201.

In conventional video processing, there are three ways to separate the luma and chroma video components and these include combing horizontally, combing vertically, and combing temporally. During separation of the luma and chroma components, there are three bandwidth directions that may incur losses in the separation process and in the separated signal. Depending on the combing method that is utilized, the separated signal may have reduced vertical bandwidth, horizontal bandwidth, and/or temporal bandwidth.

The first way to separate the luma and chroma video components is by horizontal combing. Horizontal combing may be accomplished by utilizing a notch filter, such as a notch filter set at 3.58 MHz. Combing vertically may also be utilized to separate the luma and chroma video components. Combing vertically may be achieved in three different ways—the current line may be combed with the previous and the next line, the current line may be combed with the line just before it, or the current line may be combed with the line just after it. The vertical combing is performed spatially, which involves combing within one field at a time and without any temporal combing.

During combing in the current frame 209, for example, if the current line 213 is added to the previous line 211, the chroma content may cancel out and two times the luma content may be obtained. On the other hand, if the previous line 211 is subtracted from the current line 213, the luma content may cancel out and two times the chroma content may be obtained. In this way, luma and chroma content may be separated from the composite video signal for further processing. However, vertical combing may result in a reduced vertical bandwidth.

A third way to comb a composite signal is to comb temporally. Combing temporally comprises combing between two adjacent frames, for example, the current frame 209 and the previous frame 201. Further, temporal combing may be characterized by a reduced temporal bandwidth. Luma and chroma content may be separated by utilizing the same addition and subtraction method between a current line and a previous line as it was utilized with vertical combing.

FIG. 2B is a diagram illustrating combing of a correlated current line 224 and a previous line 222 in a current frame 220. In this case, there is no vertical bandwidth and the previous line 222 and the current line 224 are perfectly correlated. The current line 224 may be added with the previous line 222 and two times luma may be obtained. Similarly, the previous line 222 may be subtracted from the current line 224 so that two times chroma may be obtained.

FIG. 3 is a diagram illustrating combing of a non-correlated current line 334 and a previous line 332 in a current frame 330. In this case, there may be significant vertical bandwidth. The vertical bandwidth may be high enough so that there may be no correlation between the current line 334 and the previous line 332. When the current line 334 and the previous line 332 are combed together, there may be significant error in both the luma and chroma. This may produce combing artifacts in the obtained combed video signal. A substantially the same result may be obtained when combing temporally when there is temporal bandwidth, which indicates motion. Higher bandwidth in a given direction may cause combing in that direction to result in more incorrectly separated luma and chroma.

While 2D comb filters are adapted to process successive scan lines for a single field of a video frame, 3D comb filters are adapted to process scan lines that are taken from successive video frames. In general, for 3D comb filtering, if there is motion between the successive video frames, a 3D comb filter must revert to 2D comb filtering. Motion includes color changes and image movement between frames. Accordingly, the 3D comb filter may be required to buffer at least one frame in order to determine whether there is motion between the buffered frames. In instance where there is color changes or image movements between the buffered frames, the corresponding Y/C components for the buffered frames will be different and the results of combing would be incorrect.

Since the 3D comb filter may be required to buffer at least one frame of video data, several complete frames of video data must be stored in buffers as opposed to just 2 or 3 lines which are required by 2D comb filters. Accordingly, 3D comb filters require a large or significant amount of video memory and excessive memory processing bandwidth requirements. This large memory and excessive memory processing bandwidth requirements, along with the necessary motion detection processing, increases the cost associated with 3D comb filter solutions.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for data compression for storage of 3D comb filter data. More specifically, certain aspects of the invention may be found in a method for processing video signals having reduced storage requirements. The method may comprise band-limiting an incoming video signal during combing, where the incoming video signal may comprise a plurality of active and inactive video samples disposed within a plurality of video lines. The active video samples disposed within at least a portion of the plurality of video lines may be stored. The incoming video signal may be band-limited to 6.75 MHz. Video samples utilized for eliminating edge effects may be stored. The number of video samples utilized for eliminating edge effects may be associated with an upsampling filter tap count. The active video samples may be combed.

At least a portion of the plurality of video lines may be stored. The portion of the plurality of video lines may comprise active video lines. The portion of the plurality of video lines may be combed. At least one burst signal associated with at least a portion of the plurality of video lines may be stored. A first signal indicating at least a portion of the plurality of video lines to be stored may be generated. A second signal indicating at least a portion of video samples from the portion of the plurality of video lines to be stored may also be generated. If the first and the second signals are asserted, every other video sample from at least a portion of the plurality of video lines may be stored. A number of clock cycles during which the second signal is asserted and non-asserted may be determined and a video signal may be upsampled based on the determined number of clock cycles.

Another aspect of the invention may provide a machine-readable storage, having stored thereon, a computer program having at least one code section executable by a machine, thereby causing the machine to perform the steps as described above for processing video signals having reduced storage requirements.

The system for processing video signals having reduced storage requirements may include at least one processor that band-limits an incoming video signal during combing, wherein the incoming video signal comprises a plurality of active and inactive video samples disposed within a plurality of video lines. The processor may store the active video samples disposed within at least a portion of the plurality of video lines. The processor may band-limit the incoming video signal to 6.75 MHz in order to eliminate aliasing. The processor may also store video samples utilized for eliminating edge effects, where the number of video samples may be associated with an upsampling filter tap count. The processor may comb the active video samples and may store a portion of the plurality of video lines.

The portion of the plurality of video lines may comprise active video lines. The processor may comb the portion of the plurality of video lines. The processor may store at least one burst signal associated with at least a portion of the plurality of video lines. The processor may generate a first signal indicating at least a portion of the plurality of video lines to be stored, and a second signal indicating at least a portion of video samples from the portion of the plurality of video lines to be stored. If the first and the second signals are asserted, the processor may store every other video sample from at least a portion of the plurality of video lines. The processor may determine a number of clock cycles during which the second signal is asserted and non-asserted. The processor may upsample a video signal based on the determined number of clock cycles.

These and other advantages, aspects and novel features of the present invention, as well as details of an illustrated embodiment thereof, will be more fully understood from the following description and drawings.

DETAILED DESCRIPTION OF THE INVENTION

Figure 1A:
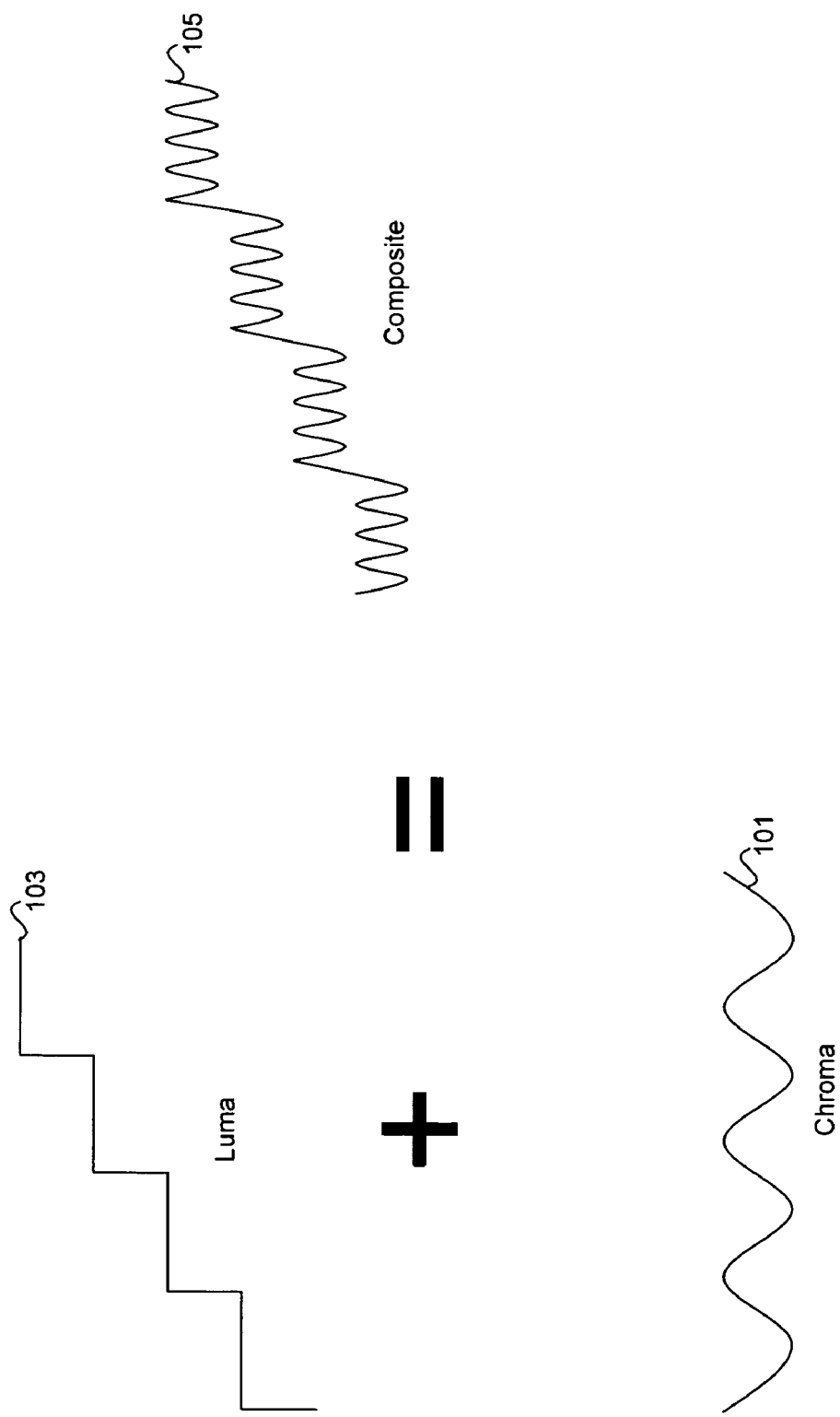
FIG. 1A is a diagram illustrating the generation of a conventional composite video signal.
Figure 1B:
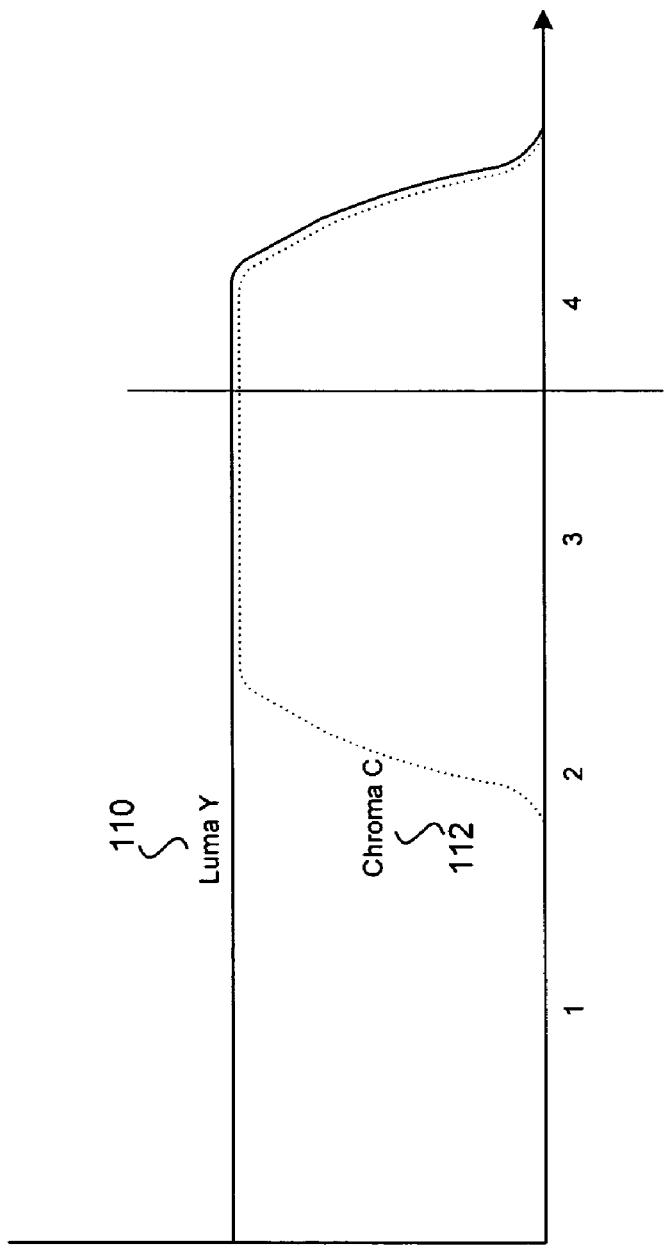
FIG. 1B is a graph illustrating the frequency spectrum for luma and chroma components of the composite video signal of FIG. 1A.
Figure 2A:
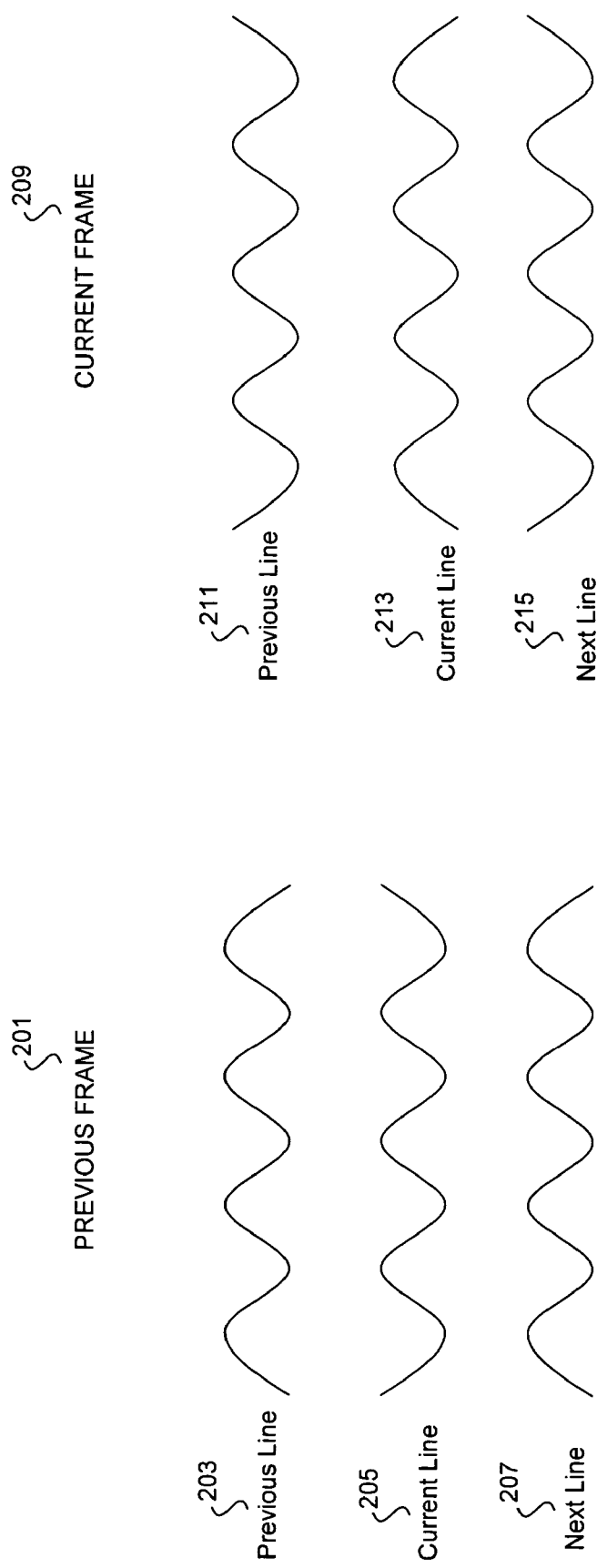
FIG. 2A is a diagram illustrating modulated chroma signals in contiguous composite video frames.
Figure 2B:
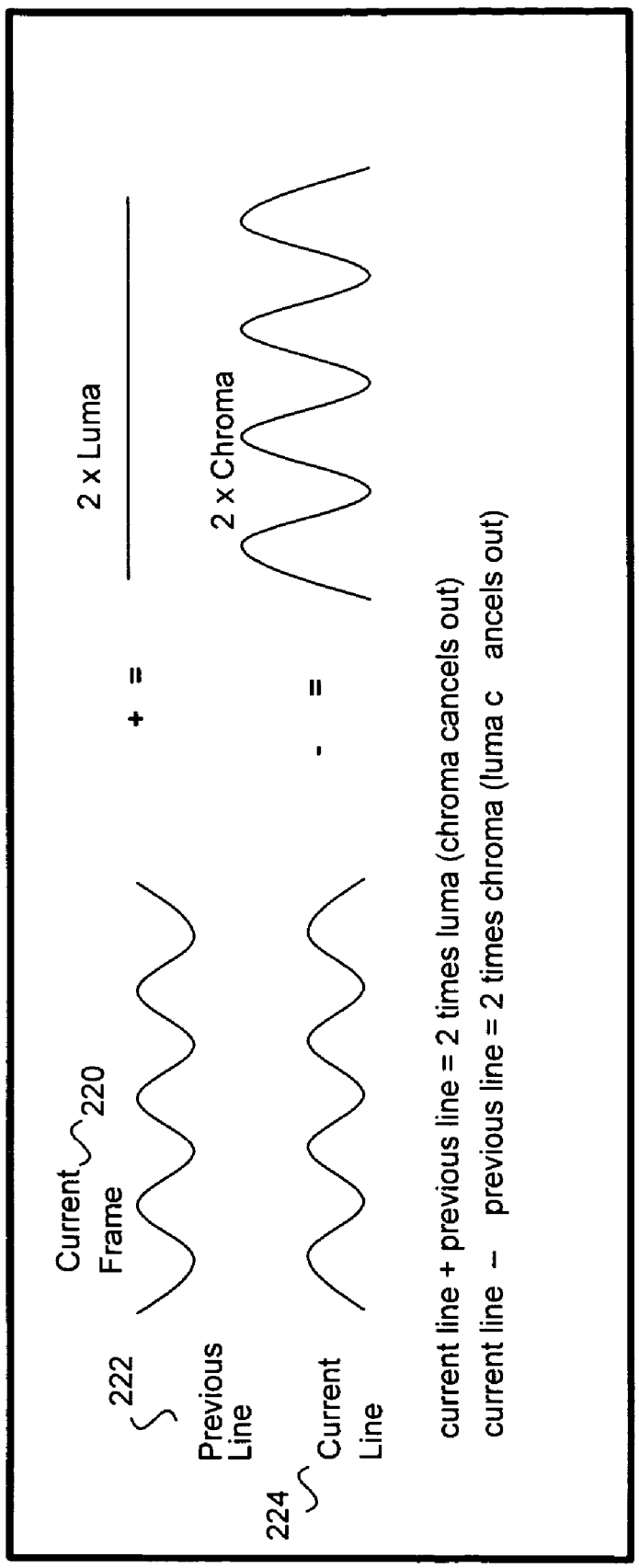
FIG. 2B is a diagram illustrating combing of a correlated current line and a previous line in a current frame.
Figure 3:
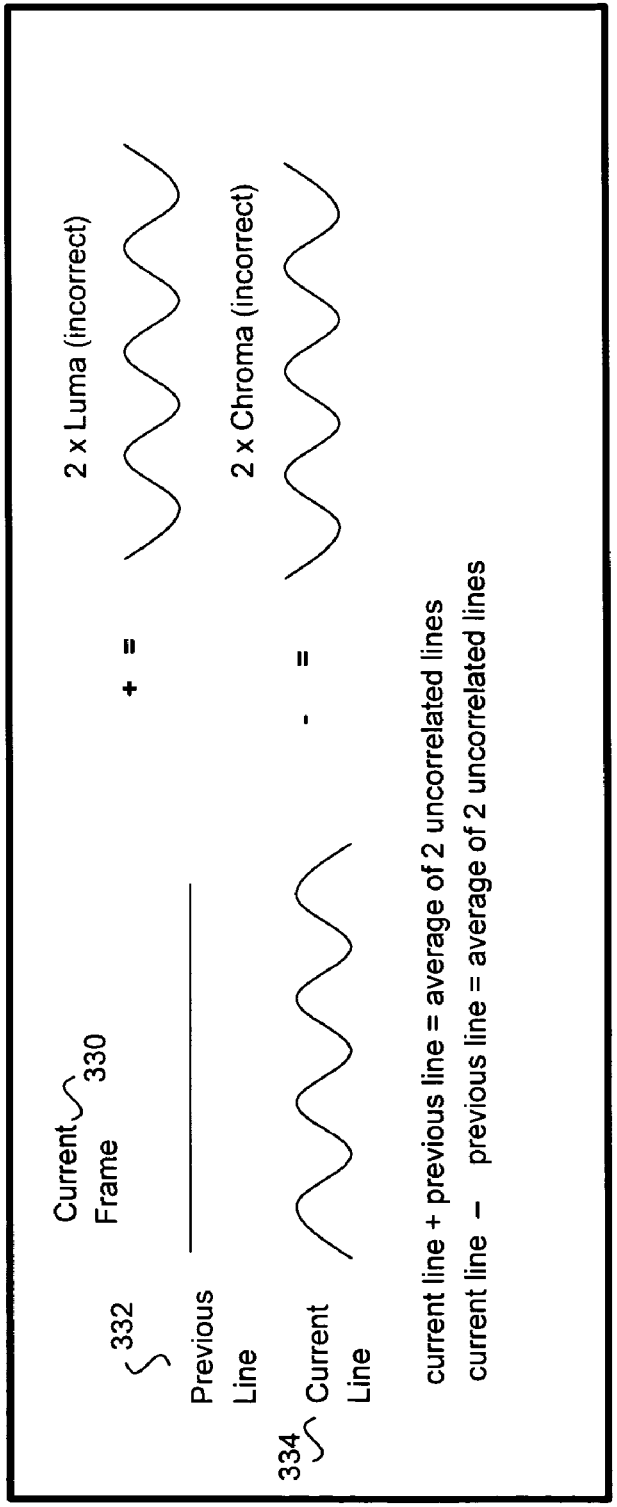
FIG. 3 is a diagram illustrating combing of a non-correlated current line and a previous line in a current frame.

Certain aspects of the invention may be found in a method and system for processing video signal having reduced storage requirements. Since YC separation utilizing 3D combing requires that a plurality of successive frames be delayed in buffers for comparison, the memory and memory bandwidth requirements may be very high. Accordingly, one aspect of the invention provides a method for reducing the amount of data stored for YC separation during 3D combing. A reduction in the amount of data stored for YC separation during 3D combing may be achieved by storing or buffering data that is necessary for 3D combing. In this regard, a reduction in the amount of memory required and the amount of memory bandwidth utilized for YC separation during 3D combing may therefore be achieved through data compression.

The NTSC standard limits the bandwidth of incoming signals to 4.2 MHz and the PAL standard limits the incoming signal to maximum of about 6.0 MHz. Given these bandwidth limitations, in compliance with Nyquist's theory, an incoming signal may be recovered if a sampling frequency of 12 MHz or greater is utilized. However, signals may also be generated from any of a plurality of common non-standard sources. These non-standard sources may have bandwidths that may exceed 7 MHz. A video decoder chip, for example, may have the capability to handle these non-standard inputs and may require a sampling frequency of at least 14 MHz. Some applications, for example, may utilize a sampling frequency of 27 MHz.

In accordance with an embodiment of the invention, YC separation utilizing 3D combing may require the use of temporal samples, which are samples that are separated by a frame. More generally, the samples may be separated by at least one frame. However, the greater the number of frames between samples, the greater the amount of storage that may be required. The storage requirements may be reduced by one half by storing 13.5 MHz samples instead of 27 MHz samples. In order to provide a reduction in the sampling rate from 27 MHz to 13.5 MHz without causing aliasing, the bandwidth of the incoming signal may be limited to a maximum of 6.75 MHz, for example. In instances where the incoming signal is already bandwidth limited to less than 6.75 MHz by a filter, then the bandwidth-limiting filter may not be required prior to decimation. In any case, after the incoming signal is bandwidth-limited, it may subsequently be decimated to 13.5 MHz samples. Extra video samples, equal to the number of taps of an upsampling filter, for example, may be utilized to eliminate edge effects. Further, active video lines may be utilized during combing of the composite video signal and video lines that are not in an active video region may be removed to save on resources.

The original 27 MHz signal may be accurately reconstructed by utilizing an upsampling filter. In this regard, the upsampling filter may be adapted to acquire the 13.5 MHz samples as an input and pad zeros between the samples to generate the corresponding output 27 MHz samples.

Figure 4:
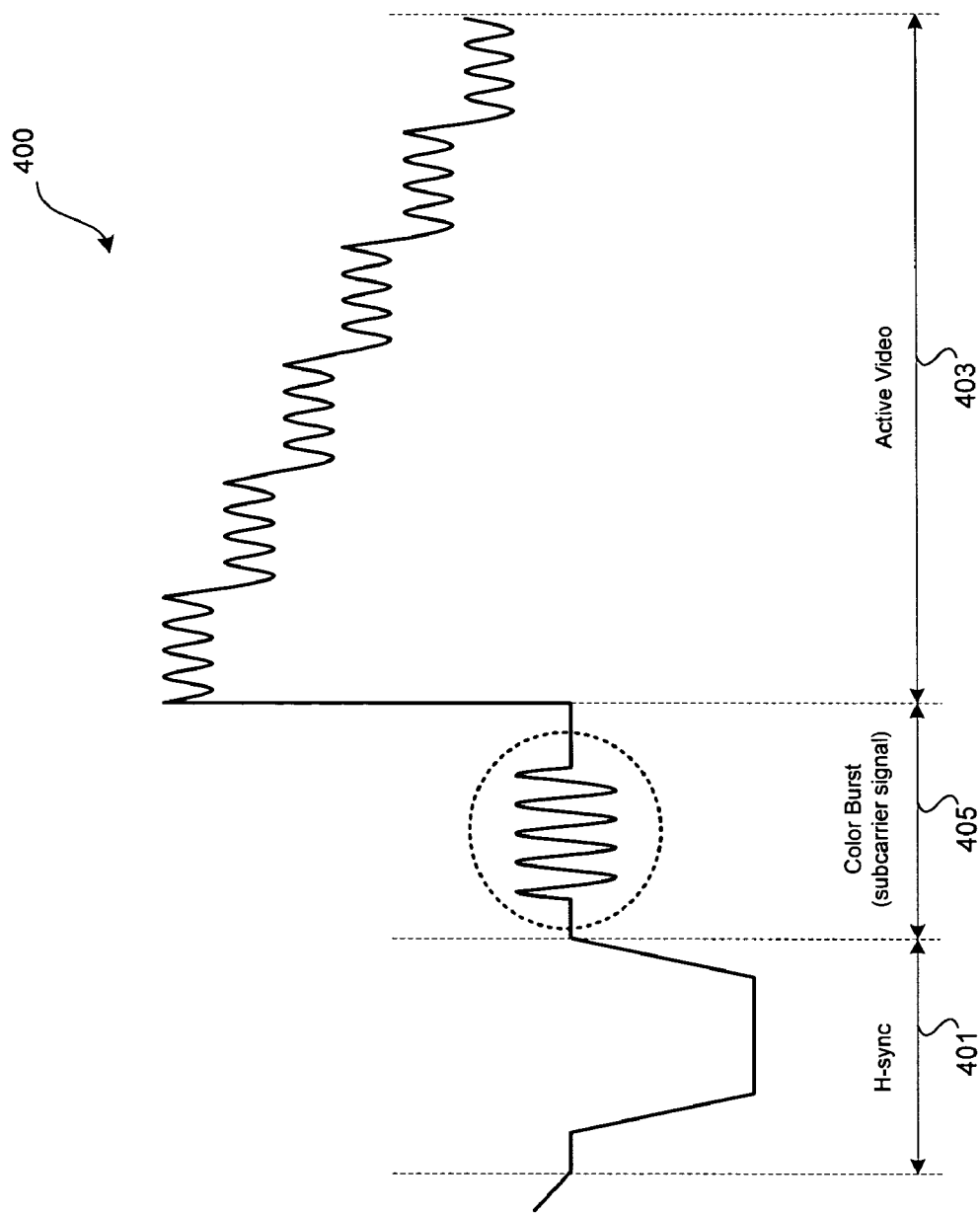
FIG. 4 is a diagram illustrating the composition of a composite video signal line in a conventional composite video signal.

FIG. 4 is a diagram illustrating the composition of a composite video signal line 400 in a conventional composite video signal. Referring to FIG. 4, a portion of the composite video signal line 400 may comprise a horizontal synchronization (H-sync) portion 401, a color burst portion 405, and an active video portion 403. The color burst 405 may comprise a brief sample of, for example, eight to ten cycles of unmodulated color subcarrier frequency. The subcarrier frequency may have been inserted by a NTSC or a PAL encoder onto the back porch of the composite video signal to enable a decoder to regenerate the color subcarrier from it. The active video portion 403 of the composite video signal line 400 contains the luma and chroma signal components of the picture or image.

An algorithm utilized by a 3D comb filter for YC separation may require information related to the active video portion 403 of each video line 400. A substantial reduction in the amount of required storage may be realized by storing data related to the relevant portions of a required line. In one aspect of the invention, the active video portion 403 may be utilized and the remaining portions of the composite video signal line 400 may be discarded.

It may also be necessary in some instances to store color burst samples and in other instances, it may not be necessary to store color burst samples. The decision regarding whether or not to store color bust samples may depend on whether it is necessary to align the current and frame-delayed signals. Hence, in instances where it may required to align the current and frame-delayed signals, the color burst samples may be stored. In a different aspect of the invention, the color burst 405 may also be utilized for synchronization.

Each field of composite video may comprise active video lines and blanked video lines. For example, a NTSC compliant video may comprise 525 lines per frame and two fields per frame. A frame may comprises 21 blanked video lines per NTSC field. In accordance with an aspect of the invention, a reduction of approximately 42/525, or 8%, in storage space may be realized by eliminating the storage of blank lines. In this regard, data related to active or non-blank lines may be stored. Once the frame data has been compressed, the original signal may have to be reconstructed based on the compressed data. Since the number of samples of each line may vary, the number of samples for each compressed line may be measured and stored along with the data samples. A data packet and/or a control packet may be utilized to store data related to the samples.

Figure 5:
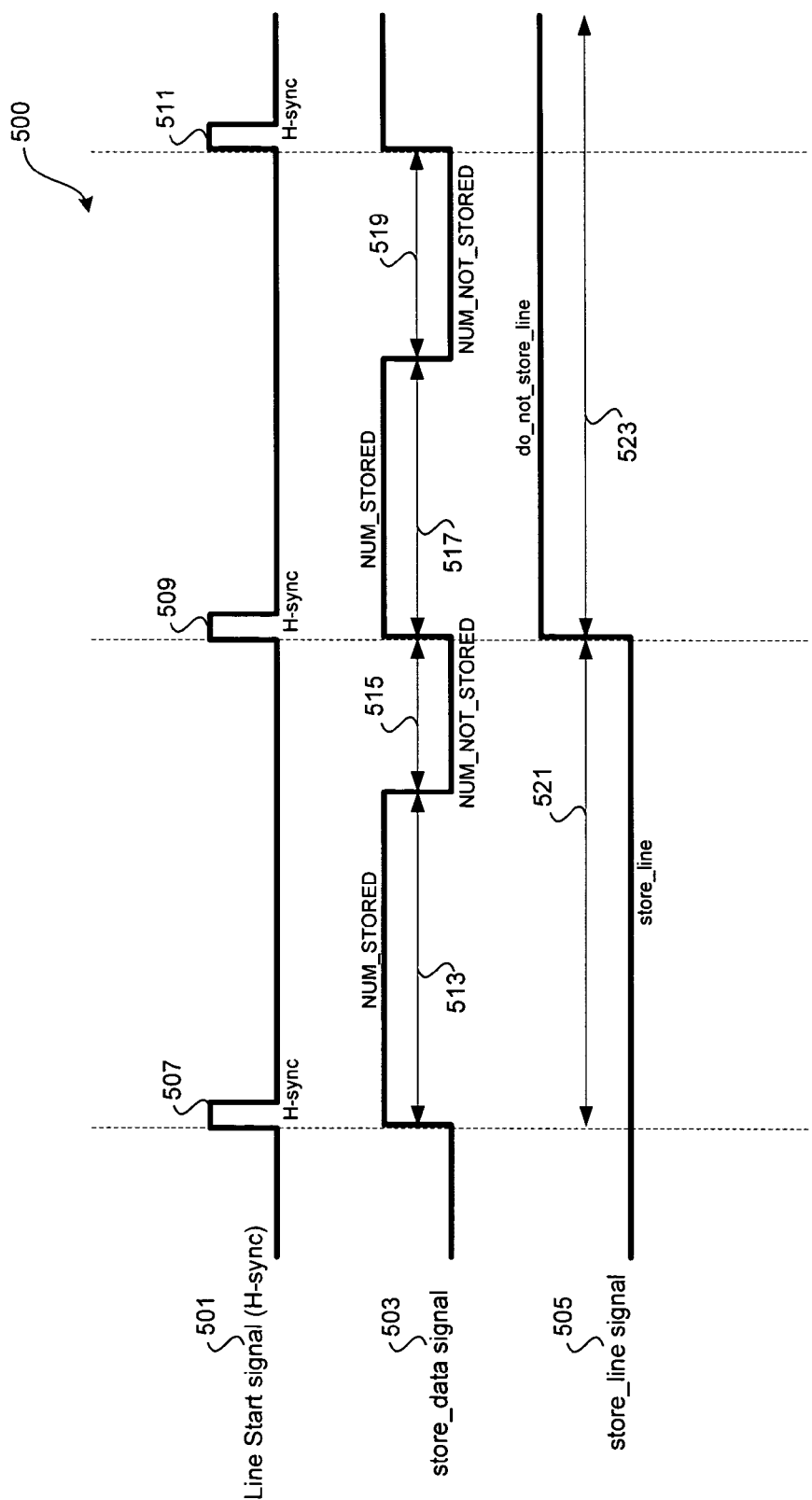
FIG. 5 is an exemplary timing diagram illustrating frame compression, in accordance with an embodiment of the invention.

FIG. 5 is an exemplary timing diagram 500 illustrating frame compression, in accordance with an embodiment of the invention. Referring to FIG. 5, the timing diagram 500 reflects timing between a line start signal (H-sync) 501, a store_data signal 503, and a store_line signal 505. Composite video lines may start at the H-sync impulses 507, 509 and 511. The store_line signal 505 may indicate the active video lines that may be stored. The store_data signal 503 may indicate which portion, or active video samples, of a video line may be stored. The store_data signal 503 may be active for NUM_STORED clock cycles and inactive for NUM_NOT_STORED clock cycles. In this regard, if the store_data signal 503 is asserted, NUM_STORED values 513 and 517 may be obtained. If the store_data signal 503 is not asserted, NUM_NOT_STORED values 515 and 519 may be obtained. The store_line signal 505 may be asserted for the duration 523, for video lines beginning at H-sync 509, and may be dis-asserted for the duration 521, for a video line beginning at H-sync 507.

In an aspect of the invention, 3D comb filtering for YC separation may comprise a setup phase, a storage phase and a reconstruction phase. In the setup phase, a signal, for example, a store_line signal 505 may be generated. A store_data signal 503 may also be generated. The bandwidth of the incoming composite video signal may be limited without decimating the resulting bandwidth-limited signal.

In the storage phase, the store_data signal 503 may become active or asserted for the duration of NUM_STORED clock cycles 513 and 517. Once the store_data signal 503 becomes active, the resulting bandwidth-limited signal may be decimated by keeping every other sample in a store data area, starting with the first sample, and throwing away or discarding every other sample. The kept samples may be stored in a data packet. There may be more than one sample per data packet. When the store_line signal 505 is active, for example for the duration 523, the data packets may be stored in memory. The number of clock cycles for which the store_data signal 503 is inactive may be counted and stored in, for example, the parameters NUM_NOT_STORED 515 and 519. The parameters NUM_NOT_STORED 515 and 519 may be stored in a control packet, for example. The parameters NUM_NOT_STORED 515 and 519 may be stored to memory regardless of the state of the store_line signal 505. However, the invention may not be so limited.

In the reconstruction phase, the control and data packets may be read from memory. If data read from the memory is a data packet, the data may be output on one clock followed by a zero on the next clock. This may be referred to as zero padding. If the data read is a control packet, then NUM_NOT_STORED number of zeros may be generated in the output. If a data packet does not follow the current control packet, then NUM_STORED number of zeros may be output before starting to process the next control packet. The resulting signal may then be upsampled.

The resulting reconstructed signal may be delayed by exactly one frame. This frame-delayed signal may not be aligned with the current signal. Accordingly, in another embodiment of the invention, the frame-delayed signal may be aligned/synchronized. Alignment/synchronization may require additional control information, which may be stored in the control packets.

Although aspects of the invention relate to processing of a NTSC video signal, the invention may not be so limited. The invention may also apply to other types of video signals, for example, a PAL video signal.

Figure 6:
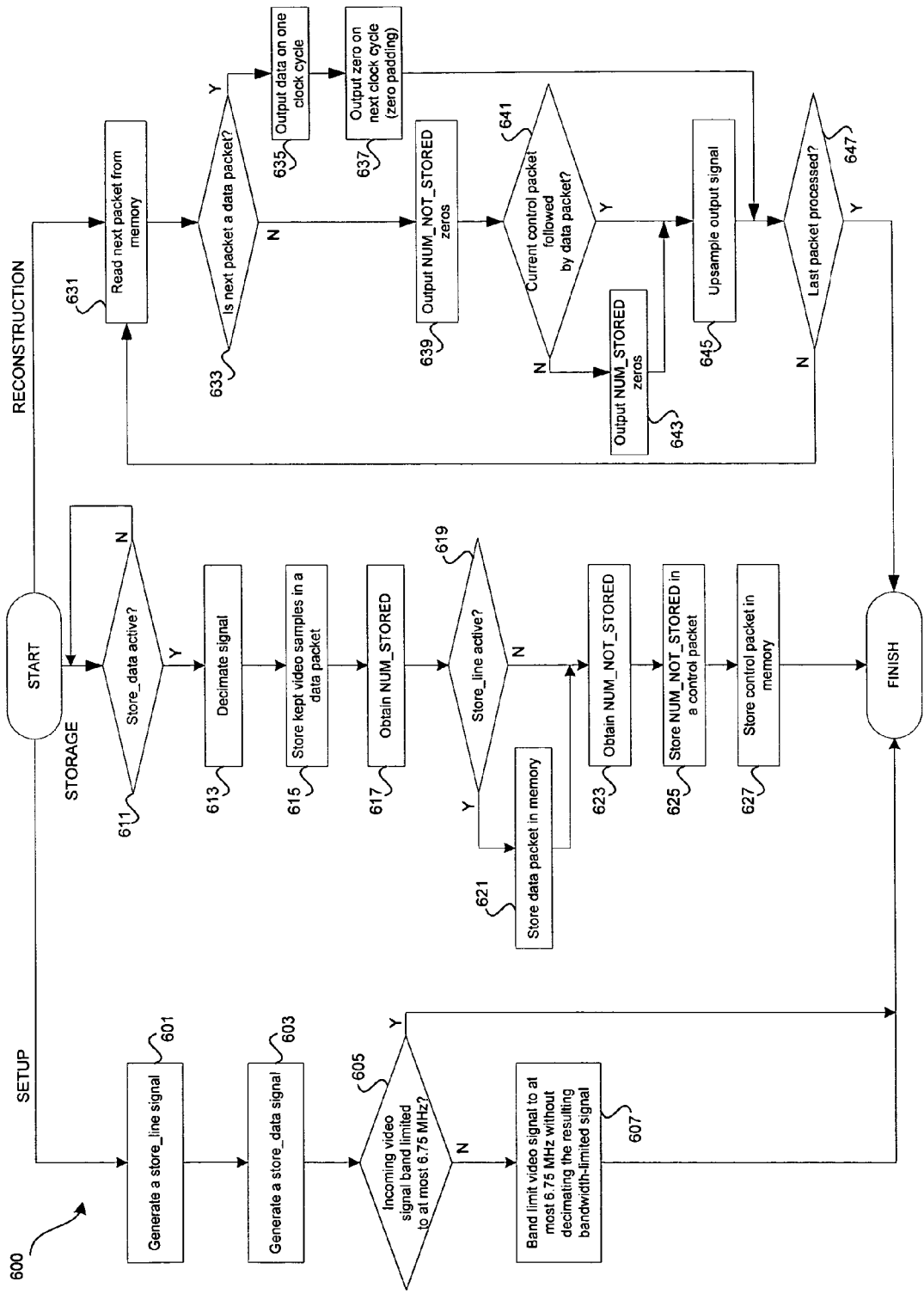
FIG. 6 is a flow diagram illustrating exemplary steps which may be utilized for data compression for storage of 3D comb filter data, in accordance with an embodiment of the invention.

FIG. 6 is a flow diagram illustrating exemplary steps 600 which may be utilized for data compression for storage of 3D comb filter data, in accordance with an embodiment of the invention. In an aspect of the invention, 3D comb filtering for YC separation may comprise a setup phase, a storage phase and a reconstruction phase. In the setup phase, at 601, a store_line signal may be generated. At 603, a store_data signal may also be generated. At 605, it may be determined whether the incoming video signal is band-limited to 6.75 MHz, for example. If the incoming video signal is not band-limited to 6.75 MHz, at 607, the incoming video signal may be band-limited to 6.75 MHz without decimating the resulting bandwidth-limited signal.

In the storage phase, at 611, it may be determined whether the store_data signal is active. Once the store_data signal becomes active, at 613, the resulting bandwidth-limited signal may be decimated. Video signal decimation may be accomplished, for example, by keeping every other sample in a store data area, starting with the first sample, and throwing away or discarding every other sample. At 615, the kept samples may be stored in a data packet. A NUM_STORED clock cycle count may be obtained at 617. At 619, it may be determined whether the store_line signal is active. If the store_line signal is active, at 621, the data packets may be stored in memory. At 623, the number of clock cycles for which the store_data signal is inactive may be obtained. At 625, the NUM_NOT_STORED count may be stored in a control packet, for example. At 627, the control packet may be stored in memory.

In the reconstruction phase, at 631, a next packet may be read from memory. At 633, it may be determined whether the next packet is a data packet. If the next packet is a data packet, at 635, data may be output on one clock cycle and, at 637, zero may be output on a next clock cycle. If the next packet is not a data packet, at 639, NUM_NOT_STORED number of zeros may be output. At 641, it may be determined whether a current control packet is followed by a data packet. If a current control packet is not followed by a data packet, a NUM_STORED number of zeros may be output at 643. If a current control packet is followed by a data packet, the output signal may be upsampled at 645. At 647, it may be determined whether a last packet has been processed. If there remain additional packets, the exemplary steps may resume at 631.

Figure 7:
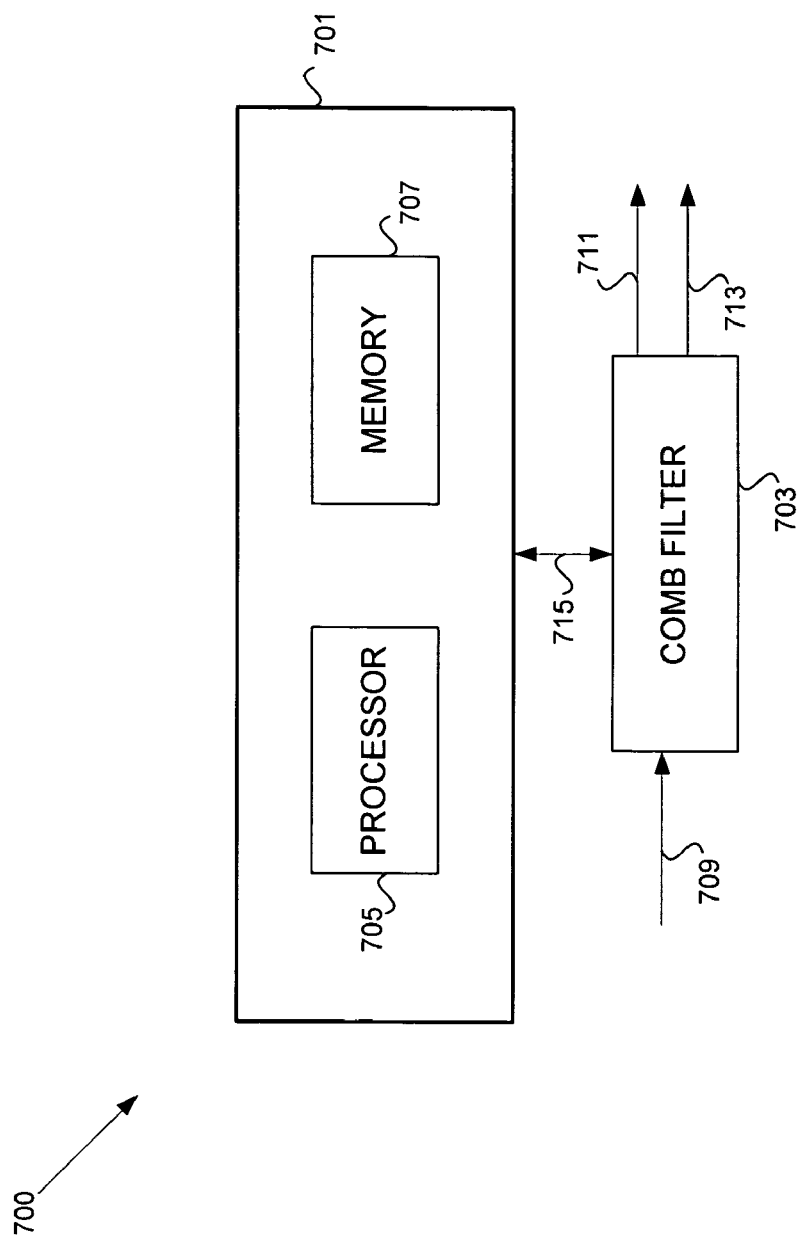
FIG. 7 is a block diagram of an exemplary system that may be utilized in connection with data compression for storage of 3D comb filter data, in accordance with an embodiment of the invention.

FIG. 7 is a block diagram of an exemplary system 700 that may be utilized in connection with data compression for storage of 3D comb filter data, in accordance with an embodiment of the invention. Referring to FIG. 7, the system 700 may comprise a host 701 and a comb filter 703. The host 701 may comprise a processor 705 and a host memory 707. The host 701 may be communicatively coupled to the comb filter 703 via an interface bus 715. In another embodiment of the present invention, the comb filter 703 may be a part of the host 701.

In operation, the comb filter 703 may comprise suitable logic, circuitry and/or code and may be adapted to receive a video signal 709, separate the chroma and luma components, and then output the chroma component 711 and the luma component 713 separately. The processor 705 may band-limit the incoming video signal 709 during combing, wherein the incoming video signal 709 may comprise a plurality of active and inactive video samples disposed within a plurality of video lines. The processor 705 may store the active video samples disposed within at least a portion of the plurality of video lines. The processor 705 may band-limit the incoming video signal 709 to 6.75 MHz. The processor 705 may also store video samples utilized for eliminating edge effects, where the number of video samples may be associated with an upsampling filter tap count. The processor 705 may comb the active video samples and may store a portion of the plurality of video lines.

The portion of the plurality of video lines may comprise active video lines. The processor 705 may comb the portion of the plurality of video lines. The processor 705 may store at least one burst signal associated with at least a portion of the plurality of video lines. The processor 705 may generate a first signal indicating at least a portion of the plurality of video lines to be stored, and a second signal indicating at least a portion of video samples from the portion of the plurality of video lines to be stored. If the first and the second signals are asserted, the processor 705 may store every other video sample from the at least a portion of the plurality of video lines. The processor 705 may determine a number of clock cycles during which the second signal is asserted and de-asserted. The processor 705 may upsample a video signal based on the determined number of clock cycles.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video signals having reduced storage requirements, the method comprising:
   band-limiting a current portion of an incoming video signal during combing of a previous portion of said incoming video signal, wherein the incoming video signal comprises a plurality of active and inactive video samples disposed within a plurality of video lines; and
   storing the active video samples disposed within at least a portion of the plurality of video lines.

2. The method according to claim 1, comprising: band-limiting the incoming video signal to 6.75 MHz.

3. The method according to claim 1, comprising: storing video samples utilized for eliminating edge effects.

4. The method according to claim 3, wherein the number of video samples utilized for eliminating edge effects is associated with an upsampling filter tap count.

5. The method according to claim 1, comprising: combing the active video samples.

6. The method according to claim 1, comprising: storing at least a portion of the plurality of video lines.

7. The method according to claim 6, wherein the portion of the plurality of video lines comprises active video lines.

8. The method according to claim 6, comprising: combing the portion of the plurality of video lines.

9. The method according to claim 1, comprising: storing at least one burst signal associated with at least a portion of the plurality of video lines.

10. The method according to claim 1, comprising: generating a first signal indicating at least a portion of the plurality of video lines to be stored.

11. The method according to claim 10, comprising: generating a second signal indicating at least a portion of video samples from the portion of the plurality of video lines to be stored.

12. The method according to claim 11, comprising: storing every other video sample from the at least a portion of the plurality of video lines, if the first and the second signals are asserted.

13. The method according to claim 11, comprising: determining a number of clock cycles during which the second signal is asserted and non-asserted.

14. The method according to claim 13, comprising: upsampling a video signal based on the determined number of clock cycles.

15. A machine-readable storage having stored thereon, a computer program having at least one code section for processing video signals having reduced storage requirements, the at least one code section being executable by a machine to perform steps comprising:
   band-limiting a current portion of an incoming video signal during combing of a previous portion of said incoming video signal, wherein the incoming video signal comprises a plurality of active and inactive video samples disposed within a plurality of video lines; and
   storing the active video samples disposed within at least a portion of the plurality of video lines.

16. The machine-readable storage according to claim 15, comprising code for band-limiting the incoming video signal to 6.75 MHz.

17. The machine-readable storage according to claim 15, comprising code for storing video samples utilized for eliminating edge effects.

18. The machine-readable storage according to claim 17, wherein the number of video samples utilized for eliminating edge effects is associated with an upsampling filter tap count.

19. The machine-readable storage according to claim 15, comprising code for combing the active video samples.

20. The machine-readable storage according to claim 15, comprising code for storing at least a portion of the plurality of video lines.

21. The machine-readable storage according to claim 20, wherein the portion of the plurality of video lines comprises active video lines.

22. The machine-readable storage according to claim 20, comprising code for combing the portion of the plurality of video lines.

23. The machine-readable storage according to claim 15, comprising code for storing at least one burst signal associated with at least a portion of the plurality of video lines.

24. The machine-readable storage according to claim 15, comprising code for generating a first signal indicating at least a portion of the plurality of video lines to be stored.

25. The machine-readable storage according to claim 24, comprising code for generating a second signal indicating at least a portion of video samples from the portion of the plurality of video lines to be stored.

26. The machine-readable storage according to claim 25, comprising code for storing every other video sample from the at least a portion of the plurality of video lines, if the first and the second signals are asserted.

27. The machine-readable storage according to claim 25, comprising code for determining a number of clock cycles during which the second signal is asserted and non-asserted.

28. The machine-readable storage according to claim 27, comprising code for upsampling a video signal based on the determined number of clock cycles.

29. A system for processing video signals having reduced storage requirements, the system comprising:
at least one processor that band-limits a current portion of an incoming video signal during combing of a previous portion of said incoming video signal, wherein the incoming video signal comprises a plurality of active and inactive video samples disposed within a plurality of video lines; and
the at least one processor stores the active video samples disposed within at least a portion of the plurality of video lines.

30. The system according to claim 29, wherein the at least one processor band-limits the incoming video signal to 6.75 MHz.

31. The system according to claim 29, wherein the at least one processor stores video samples utilized for eliminating edge effects.

32. The system according to claim 31, wherein the number of video samples utilized for eliminating edge effects is associated with an upsampling filter tap count.

33. The system according to claim 29, wherein the at least one processor combs the active video samples.

34. The system according to claim 29, wherein the at least one processor stores at least a portion of the plurality of video lines.

35. The system according to claim 34, wherein the portion of the plurality of video lines comprises active video lines.

36. The system according to claim 34, wherein the at least one processor combs the portion of the plurality of video lines.

37. The system according to claim 29, wherein the at least one processor stores at least one burst signal associated with at least a portion of the plurality of video lines.

38. The system according to claim 29, wherein the at least one processor generates a first signal indicating at least a portion of the plurality of video lines to be stored.

39. The system according to claim 38, wherein the at least one processor generates a second signal indicating at least a portion of video samples from the portion of the plurality of video lines to be stored.

40. The system according to claim 39, wherein the at least one processor stores every other video sample from the at least a portion of the plurality of video lines, if the first and the second signals are asserted.

41. The system according to claim 39, wherein the at least one processor determines a number of clock cycles during which the second signal is asserted and non-asserted.

42. The system according to claim 41, wherein the at least one processor upsamples a video signal based on the determined number of clock cycles.

43. The method according to claim 12, wherein said every other video sample is stored as a data packet.

44. The method according to claim 13, comprising: storing said number of clock cycles during which said second signal is asserted.

45. The method according to claim 13, comprising: storing said number of clock cycles as a control packet during which said second signal is non-asserted.

46. The method according to claim 1, comprising: reading data as a data packet or a control packet from said stored active video samples to form a reconstructed output.

47. The method according to claim 46, comprising: frame delaying said reconstructed output by one frame, wherein said frame delayed reconstructed output is aligned and time synchronized.

48. The method according to claim 47, comprising: utilizing control information within said control packet to align and time synchronize said frame delayed reconstructed output.

49. The machine-readable storage according to claim 26, wherein said every other video sample is stored as a data packet.

50. The machine-readable storage according to claim 27, comprising storing said number of clock cycles during which said second signal is asserted.

51. The machine-readable storage according to claim 27, comprising storing said number of clock cycles as a control packet during which said second signal is non-asserted.

52. The machine-readable storage according to claim 15, comprising reading data as a data packet or a control packet from said stored active video samples to form a reconstructed output.

53. The machine-readable storage according to claim 52, comprising frame delaying said reconstructed output by one frame, wherein said frame delayed reconstructed output is aligned and time synchronized.

54. The machine-readable storage according to claim 53, comprising control information within said control packet to align and time synchronize said frame delayed reconstructed output.

55. The system according to claim 40, wherein said every other video sample is stored as a data packet.

56. The system according to claim 41, wherein the at least one processor stores said number of clock cycles during which said second signal is asserted.

57. The system according to claim 41, wherein the at least one processor stores said number of clock cycles as a control packet during which said second signal is non-asserted.

58. The system according to claim 29, wherein the at least one processor reads data as a data packet or a control packet from said stored active video samples to form a reconstructed output.

59. The system according to claim 58, wherein the at least one processor facilitates frame delay to said reconstructed output by one frame, wherein said frame delayed reconstructed output is aligned and time synchronized.

60. The method according to claim 59, wherein the at least one processor controls information within said control packet to align and time synchronize said frame delayed reconstructed output.

* * * * *